(12) United States Patent
Coker et al.

(10) Patent No.: US 7,349,466 B2
(45) Date of Patent: Mar. 25, 2008

(54) PARALLEL INTERFACE TRANSMISSION USING A SINGLE MULTI-FREQUENCY COMPOSITE SIGNAL

(75) Inventors: Kenny T. Coker, Mustang, OK (US); Hans J. Rodrigues de Miranda, Yukon, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 851 days.

(21) Appl. No.: 10/186,943

(22) Filed: Jun. 28, 2002

(65) Prior Publication Data

US 2003/0185290 A1    Oct. 2, 2003

Related U.S. Application Data

(60) Provisional application No. 60/368,202, filed on Mar. 28, 2002.

(51) Int. Cl.
H04B 1/38         (2006.01)
(52) U.S. Cl. ..................................... 375/222
(58) Field of Classification Search ............... 375/220, 375/222, 257, 377, 295, 316; 710/65, 71; 370/535, 540, 536–538, 542–543, 366, 329–330, 370/280–281, 294–295
See application file for complete search history.

(56) References Cited

U.S. PATENT DOCUMENTS

| | | | | |
|---|---|---|---|---|
| 4,734,696 A | * | 3/1988 | Rogers | 370/465 |
| 4,751,699 A | * | 6/1988 | Tarridec et al. | 370/538 |
| 5,079,770 A | * | 1/1992 | Scott | 370/536 |
| 5,088,112 A | * | 2/1992 | Pyhalammi et al. | 375/257 |
| 5,206,946 A | * | 4/1993 | Brunk | 710/2 |
| 5,737,632 A | * | 4/1998 | Oeda et al. | 710/1 |
| 5,748,924 A | | 5/1998 | Llorens et al. | |
| 5,784,370 A | | 7/1998 | Rich | |
| 6,041,080 A | * | 3/2000 | Fraisse | 375/242 |
| 6,145,024 A | | 11/2000 | Maezawa et al. | |
| 6,256,687 B1 | * | 7/2001 | Ellis et al. | 710/71 |
| 6,272,130 B1 | * | 8/2001 | Panahi et al. | 370/366 |
| 6,310,910 B1 | | 10/2001 | Shah et al. | |
| 6,404,752 B1 | | 6/2002 | Allen, Jr. et al. | |
| 6,480,924 B1 | * | 11/2002 | Bengtsson et al. | 710/306 |
| 6,914,901 B1 | * | 7/2005 | Hann et al. | 370/366 |
| 7,000,037 B2 | * | 2/2006 | Rabinovitz et al. | 710/71 |
| 7,069,464 B2 | * | 6/2006 | Gredone et al. | 713/600 |

* cited by examiner

*Primary Examiner*—Khanh C. Tran
(74) *Attorney, Agent, or Firm*—Fellers, Snider, et al.

(57) ABSTRACT

A parallel interface modem for simultaneous transfer of a plurality of parallel signals across a medium is disclosed. In a preferred embodiment, the parallel interface modem includes a modulation circuit for qualifying each of the plurality of parallel device interface signals for serial transmission. Each of the plurality of qualified signals substantially simultaneously accumulates at a summing junction responsive to the modulation circuit. A mixer communicating with the summing junction combines the plurality of accumulated qualified signals to provide a multi-frequency signal. A serial port connector communicating with the mixer simultaneously transmits the plurality of accumulated qualified parallel device interface signals over the medium.

Additionally, the parallel interface modem includes a demodulation circuit communicating with the serial port connector demodulating each of a plurality of received signal forming a multi-frequency parallel device interface signal received from the medium.

20 Claims, 4 Drawing Sheets

PARALLEL INTERFACE TRANSMISSION USING A SINGLE MULTI-FREQUENCY COMPOSITE SIGNAL

RELATED APPLICATIONS

This application claims priority from U.S. Provisional Application No. 60/368,202 filed Mar. 28, 2002, entitled ATA Modem.

FIELD OF THE INVENTION

This invention relates generally to the field of magnetic data storage devices, and more particularly, but not by way of limitation, to a parallel interface modem for a disc drive.

BACKGROUND

Disc drives are used for data storage in modern electronic products ranging from digital cameras to computers and network systems. Typically, a disc drive includes a mechanical portion and an electronics portion in the form of a printed circuit board assembly. The printed circuit board assembly provides mechanical control and a communication interface between the disc drive and its host.

Generally, the mechanical portion, or head-disc assembly, has a disc with a recording surface rotated at a constant speed by a spindle motor assembly and an actuator assembly positionably controlled by a closed loop servo system for use in accessing the stored data. The actuator assembly commonly supports a magnetoresistive read/write head that writes data to, and reads data from, the recording surface. Normally, the magnetoresistive read/write head uses an inductive element, or writer, to write data to and a magnetoresistive element, or reader, to read data from the recording surface.

The disc drive market continues to place pressure on the industry for disc drives with increased capacity at a lower cost per megabyte and higher rates of data throughput between the disc drive and the host. High performance disc drives achieve areal bit densities in the range of several gigabits per square centimeter (Gbits/cm$^2$). Higher recording densities can be achieved by increasing the number of bits per centimeter stored along each information track, and/or by increasing the number of tracks per centimeter written across each recording surface. Increasing the number of tracks per centimeter on each recording surface generally requires improvements in servo control systems, which enable the read/write heads to be more precisely positioned relative to the information tracks. Increasing the number of bits per centimeter stored on each track generally requires improvements in the read/write channel electronics to enable data to be written to, and subsequently read from, the recording surface at a correspondingly higher frequency, which typically foster a need for improvements in the interface channel electronics for improved bit transfer rates.

Typically, interface channel electronics incorporate a parallel communication schema for data exchange. As is well known in the art, each line in a parallel communication cable has substantially distinct transmission efficiency. The transmission efficiency of any particular line is based on the impedance specific to that particular line. Variations in transmission efficiency, line to line, across a bus (such as a SCSI bus) introduces data skew, i.e., individual bits of data simultaneously transmitted, but received at slightly different times. Data skew, or signal offset, causes a reduction in transfer rate, because all the bits of a data transfer must be present for data re-assembly to complete the transfer.

Additionally, cabling electronic devices for parallel communication is costly, bulky and inhibits airflow internal to a computer enclosure. Prior solutions to these problems include conversion of ATA or SCSI data to packetized data and networking devices together. These solutions are inherently complex and necessitate embedding additional computational power into the interface electronics. Furthermore, because of packet overhead and the point-to-point requirement of the architecture, typically only about half of the interface bandwidth can be utilized. The point-to-point requirement of the architecture also precludes the full utilization of the bandwidth because only one device uses the channel at a time, thereby limiting the bandwidth resource to that device's maximum sustained data rate. For SCSI, some features would be lost with a full point-to-point bus implementation with multiple nodes interfaced on the bus. Additionally, a point-to-point networking architecture would necessitate changes in the SCSI specification to document the losses in a special subset of the SCSI specification and create a legacy problem for prior generation SCSI devices.

As such, challenges remain and a need persists for effective techniques for reducing cable bulk and eliminating data skew, while avoiding the creation of a legacy issue. It is to this and other features and advantages set forth herein that embodiments of the present invention are directed.

SUMMARY OF THE INVENTION

As exemplified by preferred embodiments, the present invention provides a parallel interface modem for simultaneous transfer of a plurality of parallel signals across a medium. In a preferred embodiment, the parallel interface modem includes a modulation circuit for qualifying each of the plurality of parallel device interface signals that are combined into a multi-frequency signal by a mixer in preparation for transmission across a medium. A serial port connector communicating with the mixer simultaneously transmits the plurality of accumulated qualified parallel device interface signals, in the form of the multi-frequency signal, over the medium.

Additionally, the parallel interface modem includes a demodulation circuit communicating with the serial port connector demodulating each individual signal of a plurality of individual signals forming a modulated multi-frequency parallel device interface signal received from the medium.

These and various other features and advantages, which characterize the present invention, will be apparent from a reading of the following detailed description and a review of the associated drawings.

DETAILED DESCRIPTION

Figure 1:
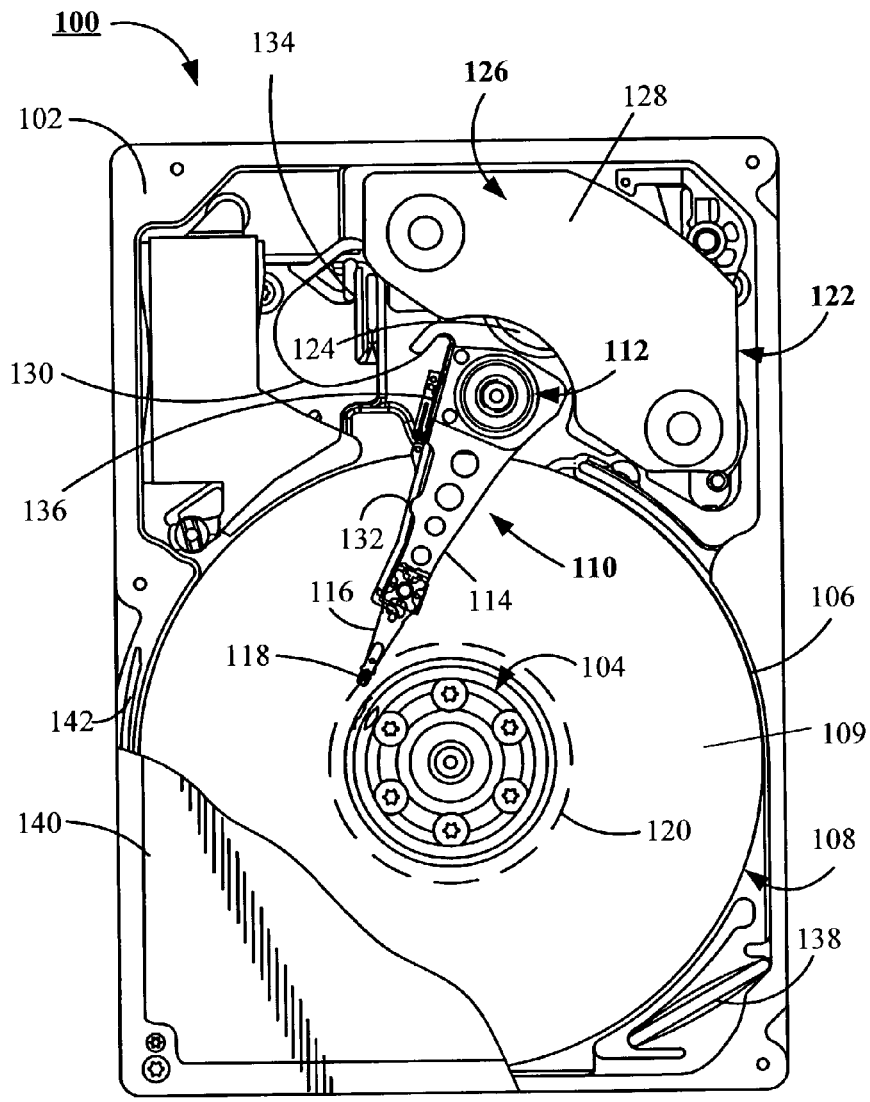
FIG. 1 is a top plan view of a disc drive that incorporates a parallel interface modem operating under a medium.

Referring to the drawings in general, and more particularly to FIG. 1, shown therein is a top view of a disc drive 100, also referred to herein as a data storage device, constructed in accordance with the present invention. Numerous details of and variations for the construction of the disc drive 100 are not included in the following description as such are well-known to those skilled in the art, and believed unnecessary for the purpose of describing the present invention.

The disc drive 100 includes a basedeck 102 supporting various data storage device components, including a spindle motor assembly 104 that supports one or more axially aligned rotatable discs 106 forming a disc stack assembly 108, each disc 106 having at least one, and usually two, recording surfaces 109.

Adjacent the disc stack assembly 108 is a head stack assembly 110 (also referred to as an actuator assembly) that pivots about a bearing assembly 112 in a rotary fashion. The actuator assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 accommodate head position control information written to embedded servo sectors (not separately depicted). Between the embedded servo sectors are data sectors used for storing data in the form of bit patterns. The read/write head 118 includes a reader element (not separately shown) offset radially and laterally from a writer element (not separately shown). The writer element writes data to the concentric information tracks 120 while the reader element controls the positioning of the read/write head 118 relative to the concentric information tracks 120 during write operations. During read operations the reader element reads data from the concentric information tracks 120 for passage to a host (not shown) serviced by the disc drive 100 and for use by a servo control system.

The term "servoing" or "position-controlling," as used herein, means maintaining control of the read/write head 118 relative to the rotating recording surface 109 during operation of the disc drive 100. When servoing to or servoing on a selected information track 120, the actuator assembly 110 is controllably positioned by a voice coil motor assembly 122. The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surface 109.

To provide the requisite electrical conduction paths between the read/write head 118 and read/write circuitry (not shown) of the disc drive 100, read/write head wires (not shown) affixed to the read/write head 118 are attached to a read/write flex circuit 130. The read/write flex circuit 130 is routed from the load arm 116 along the actuator arm 114, into a flex circuit containment channel 132 and secured to a flex connector body 134. The flex connector body 134 supports the flex circuit 130 during passage through the basedeck 102 and into electrical communication with a printed circuit board assembly (PCBA) (not shown) typically mounted to the underside of the basedeck 102.

The flex circuit containment channel 132 also supports read/write signal circuitry including a preamplifier/driver (preamp) 136 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

To assure a continually clean interior operating environment, a hepa filter 138 is provided to extract particles from the interior operating environment while the disc drive 100 is in an operating mode. To preclude migration of particles into the interior operating environment, a top cover 140 compresses a gasket 142 against the basedeck 102 to form a hermetic seal between the interior environment of the disc drive 100 and the environment exterior to the disc drive 100.

Figure 2:
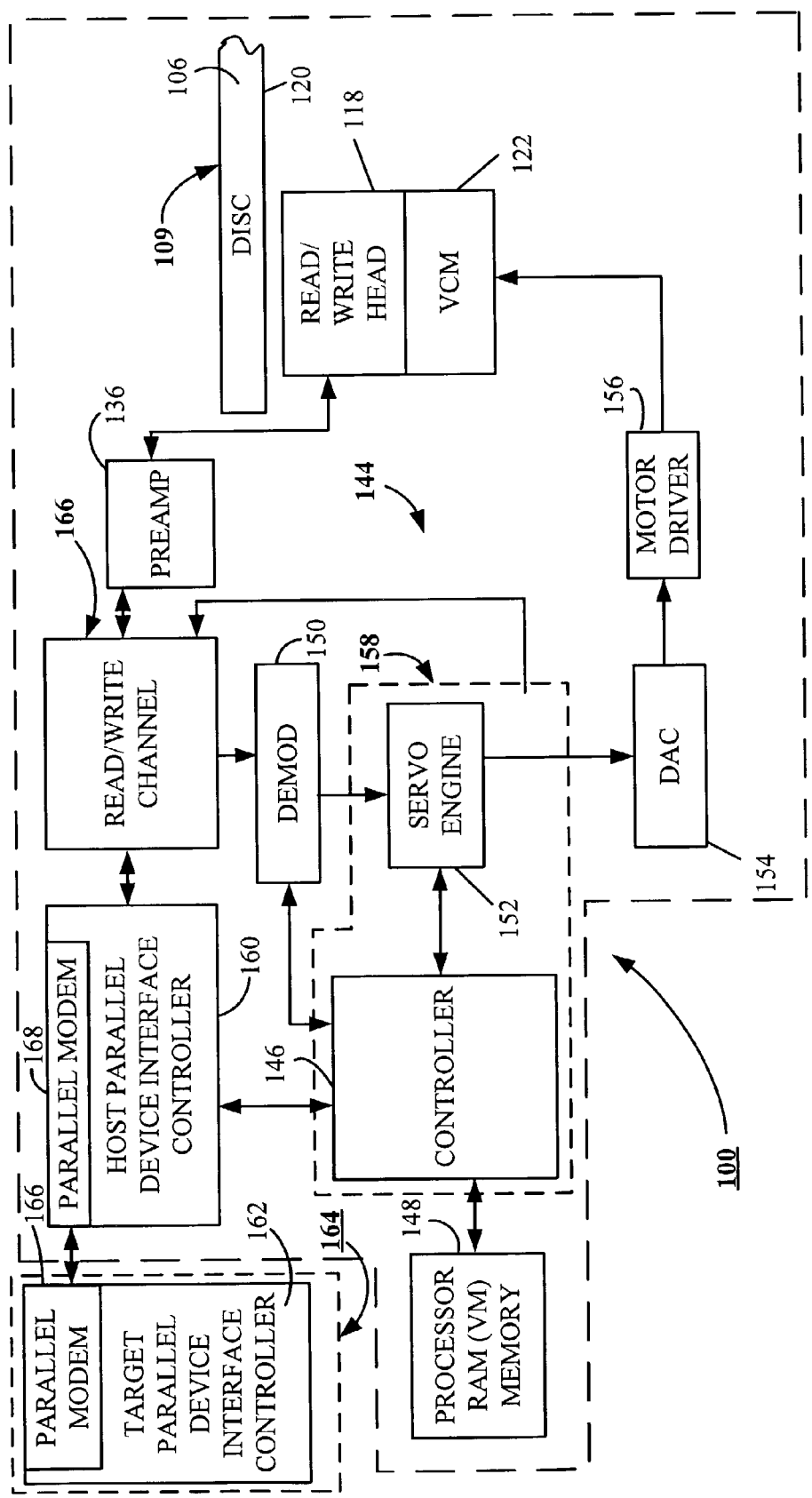
FIG. 2 is a functional block diagram of the disc drive of FIG. 1 with the parallel interface modem integrated within a host parallel device interface controller.

Turning to FIG. 2, position-controlling of the read/write head 118 is provided by the positioning mechanism (not separately shown) operating under the control of a servo control circuit 144 programmed with servo control code, which forms a servo control loop. The servo control circuit 144 includes a microprocessor controller 146 (also referred to herein as controller 146), a volatile memory or random access memory (VM) 148, a demodulator (DEMOD) 150, an application specific integrated circuit (ASIC) hardware-based servo controller ("servo engine") 152, a digital to analog converter (DAC) 154 and a motor driver circuit 156. Optionally, the controller 146, the random access memory 148, and the servo engine 152 are portions of an application specific integrated circuit 158. Typically, a portion of the random access memory 148 is used as a cache for data read from the information track 120 awaiting transfer to a host connected to the disc drive 100 and for data transferred from the host to the disc drive 100 to be written to the information track 120. The components of the servo control circuit 142 are utilized to facilitate track following algorithms for the actuator assembly 110 (of FIG. 1) and more specifically for controlling the voice coil motor 122 in position-controlling the read/write head 118 relative to the selected information track 120 (of FIG. 1).

The demodulator 150 conditions head position control information transduced from the information track 120 of the rotatable recording surface 109 to provide position information of the read/write head 118 relative to the information track 120. The servo engine 152 generates servo control loop values used by the control processor 146 in generating command signals such as seek signals used by voice coil motor 122 in executing seek commands. Control loop values are also used to maintain a predetermined position of the actuator assembly 110 during data transfer operations. The command signals generated by the control processor 146 and passed by the servo engine 152 are converted by the digital to analog converter 154 to analog control signals. The analog control signals are used by the motor driver circuit 156 in position-controlling the read/ write head 118 relative to the selected information track 120, during track following, and relative to the rotatable recording surface 109 during seek functions.

In addition to the servo control code program of the application specific integrated circuit 158, control code is also programmed into the application specific integrated circuit 158 for use in executing and controlling data transfer functions between a host parallel device interface controller 160 of the disc drive 100 and a target parallel device interface controller 162 of a host 164. A read/write channel electronics 166, operating under control of the controller 148 executing the control code, passes data received from the host 164, via a parallel interface modem 166 of the target parallel device interface controller 162, for storage on the disc 106 and passes data read from the disc 106 back to the host 164, via a parallel interface modem 168 of the host parallel device interface controller 160.

Examples of the interface technology utilized by the host parallel device interface controller 160 and the target parallel device interface controller 162 include an advanced technology attachment (ATA) interface and a small computer systems interface (SCSI). Both the ATA and SCSI interface technologies incorporate the use of parallel interface cables, and for the SCSI instance the cable lengths are confined to a few meters. Under the present invention, whether for ATA or SCSI or equivalent interfaces, the signals themselves, not the data that they represent, are translated for use in a medium. More exactly, each parallel interface modem 166 or 168 in communication with a device in the system modulates/demodulates the bandwidth available for each specified interface signal for transmission on a medium, for example, a coaxial, fiber optic, unshielded twisted pair (UTP) cable or though space.

As discussed further below, in a preferred embodiment, a multi-frequency signal that includes a specific frequency component for each individual interface signal is formed by a mixer (a device that combines two or more signals, yielding one output signal whose nature is determined by the characteristics of the circuit). By transmitting the multi-frequency signal across the medium, each of a plurality of component signals that collectively form a parallel communication is simultaneously transmitted on the medium. However, because only one line or carrier is used for the multi-frequency signal, as opposed to a dedicated line for each signal, data skew is eliminated from the transmission.

Additionally, because the data presented for transmission across the medium is not altered for transmission, but included in the form of a specific frequency of the multi-frequency signal, the devices themselves still understand the interface protocol in use. Therefore, no changes are needed for the underlying interface specifications for incorporation or adaptation of the present invention on current or legacy systems. In other words, no interface features are lost and implementation is robust and scalable for future growth of commented devices on a system.

Figure 3:
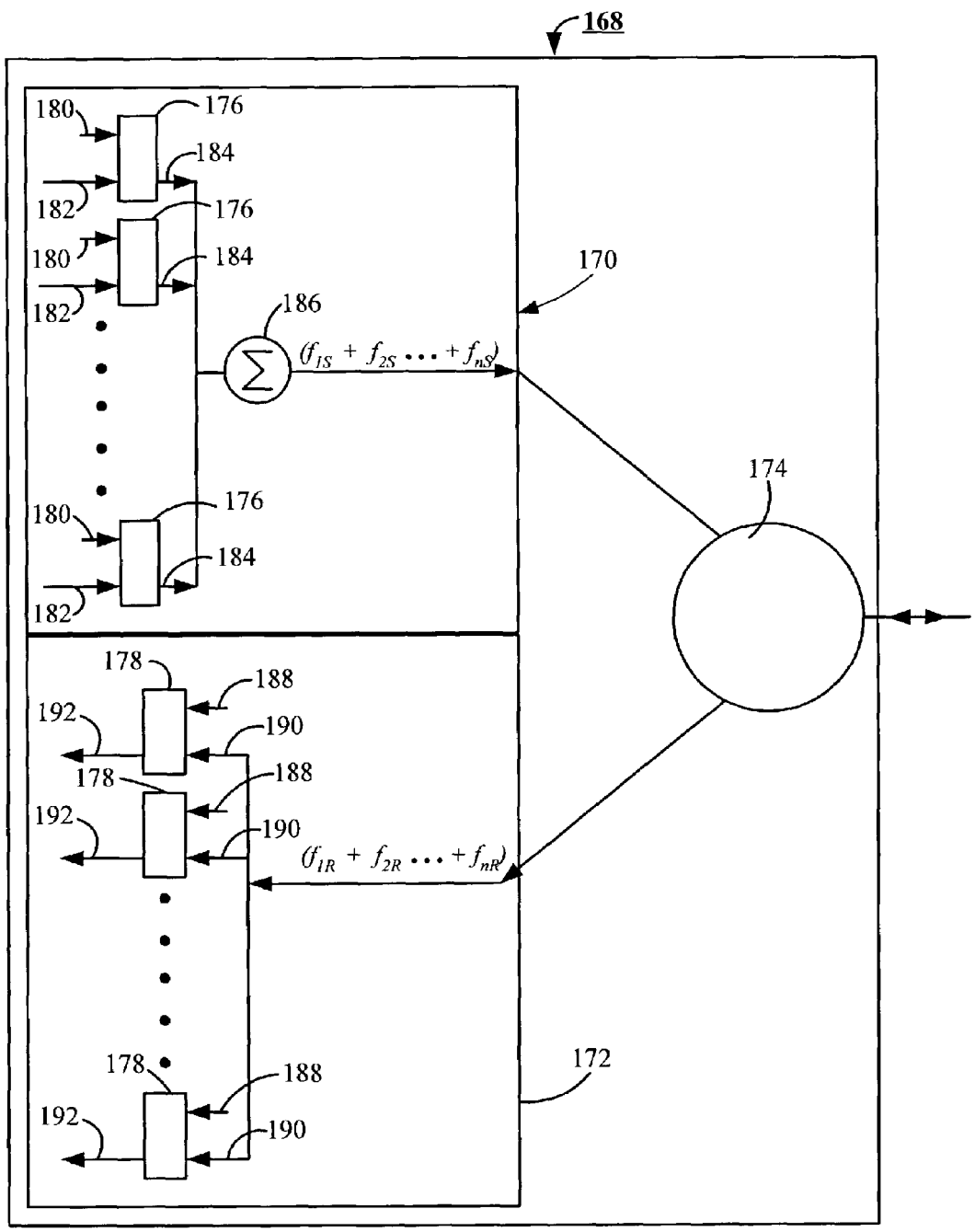
FIG. 3 is a circuit diagram of an embodiment of the parallel interface modem of the disc drive of FIG. 2.

FIG. 3 shows a modulation portion 170, a demodulation portion 172 and a mixer 174 of a preferred embodiment of the parallel interface modem 168. It will be understood that to enhance the understanding of the present invention, without imposing limitations on the present invention, a signal sense switch 176 has been selected as a type of device suitable for use by the modulation portion 170 of the present invention. Also, a demodulator 178 has been selected as a device suitable for use in the demodulation portion 172 of the present invention. Additionally, an On-Off Keying modulation technique has been selected as a modulation method for disclosure of the present invention. When practicing the present invention it will be understood that alternate modulation means and techniques may be utilized while remaining within the scope of the present invention.

The modulation portion 170 includes a plurality of signal sense switches 176. Each signal sense switch 176 of the modulation portion 170 services a specific signal of the parallel communication signal from the host parallel interface controller 160 (FIG. 2) of the disc drive 100 (FIG. 1). Each demodulator 178 of the demodulation portion 172 demodulates a specific signal of a modulated parallel communication signal from the target parallel interface controller 162 (FIG. 2) of the host 164 (FIG. 2).

As part of the communication protocol, each interface standard (ATA, SCSI, etc.) assigns a frequency to each interface signal of the parallel communication signal covered under the interface standard. For each particular signal defined by the interface standard, a signal sense switch 176 is provided by the modulation portion 170 of the parallel interface modem 168 to service that particular signal. To service a particular signal, a clock signal with a frequency defined by the communication protocol standard for that particular signal is provided to the specific signal sense switch 176 servicing that particular signal at clock signal input line 180.

During operation of the parallel interface modem 168 for transmission from a device (such as disc drive 100) to a host (such as 164), if a particular signal is present in a parallel communication data presented, that particular signal is present on a communication signal input line 182 of the signal sense switch 176 servicing that particular signal. The signal sense switch 176 passes a signal with a frequency of the provided clock signal for further processing. If a signal is present on the signal input line 182, the signal sense switch 176 qualifies the signal present on the communication line 182 by switching the provided clock signal on input line 180 to a signal output line 184 for further processing. For the present described preferred embodiment, further processing is passage of the signal present on the signal output line 184 to a summing junction 186.

With no signal present on the communication signal input line 182, the signal sense switch 176 fails to provide a circuit path to the summing junction 188. The same event sequence occurs for each particular signal present in the parallel communication data presented for transmission.

For transmission across the medium, the mixer 174 provides a multi-frequency signal generated from the signals present at the summing junction. Each individual frequency component of the multi-frequency signal is a result of the presence of a signal passed to the summing junction 186 by one of the plurality of signal sense switches 176, which represents one of the bits forming the parallel communication data being transmitted.

For each particular signal defined by the interface standard, a demodulator 178 is provided by the demodulation portion 172 of the parallel interface modem 168 to service that particular signal. To service a particular signal, a clock signal with a frequency defined by the communication protocol standard for that particular signal is provided to the specific demodulator 178 servicing that particular signal at clock signal input line 188.

During operation of the parallel interface modem 168 for transmission from a host (such as 164) to a device (such as disc drive 100), a multi-frequency signal is presented to the demodulation portion 172 of the parallel interface modem 168. If a particular signal is present in multi-frequency signal presented, that particular signal is present on a receive signal input line 190 of the demodulator 178 servicing that particular signal. The demodulator 178 compares the frequency of the clock signal on the clock frequency input line 188 with the frequency of the particular signal present on the receive signal input line 190. If a frequency match is determined between the signals, the demodulator 178 demodulates the signal from the multi-frequency signal and provides an interface signal of the parallel communication signal in compliance with the interface standard on a signal input line 192.

With no signal present of a particular frequency from the multi-frequency signal on the receive signal input line 190 with a frequency consistent with the frequency of the clock signal on the clock frequency input line 188, the demodulator 178 fails to present a signal on the signal input line 192. The same event sequence occurs for each particular frequency present in the multi-frequency signal presented for demodulation by the demodulation portion 172 of the parallel interface modem 168.

Figure 4:
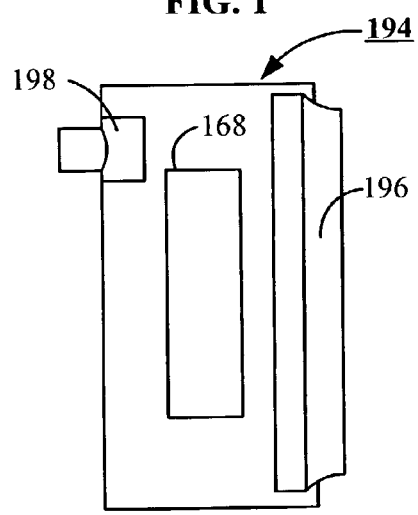
FIG. 4 is a standalone embodiment of the parallel interface modem of the disc drive and of the host of FIG. 2 for use in connecting legacy devices.

FIG. 4 shows an alternate embodiment of the present invention in the form of an interface adapter 194. In addition to supporting the parallel interface modem 168, the interface adapter 194 supports an interface connector 196 communicating with the parallel interface modem 168, and a medium connector 198. The interface connector is used for connection to a legacy device and provides access for the legacy device to a medium while the medium connector 198 provides a connection to the medium for the legacy device.

Figure 5:
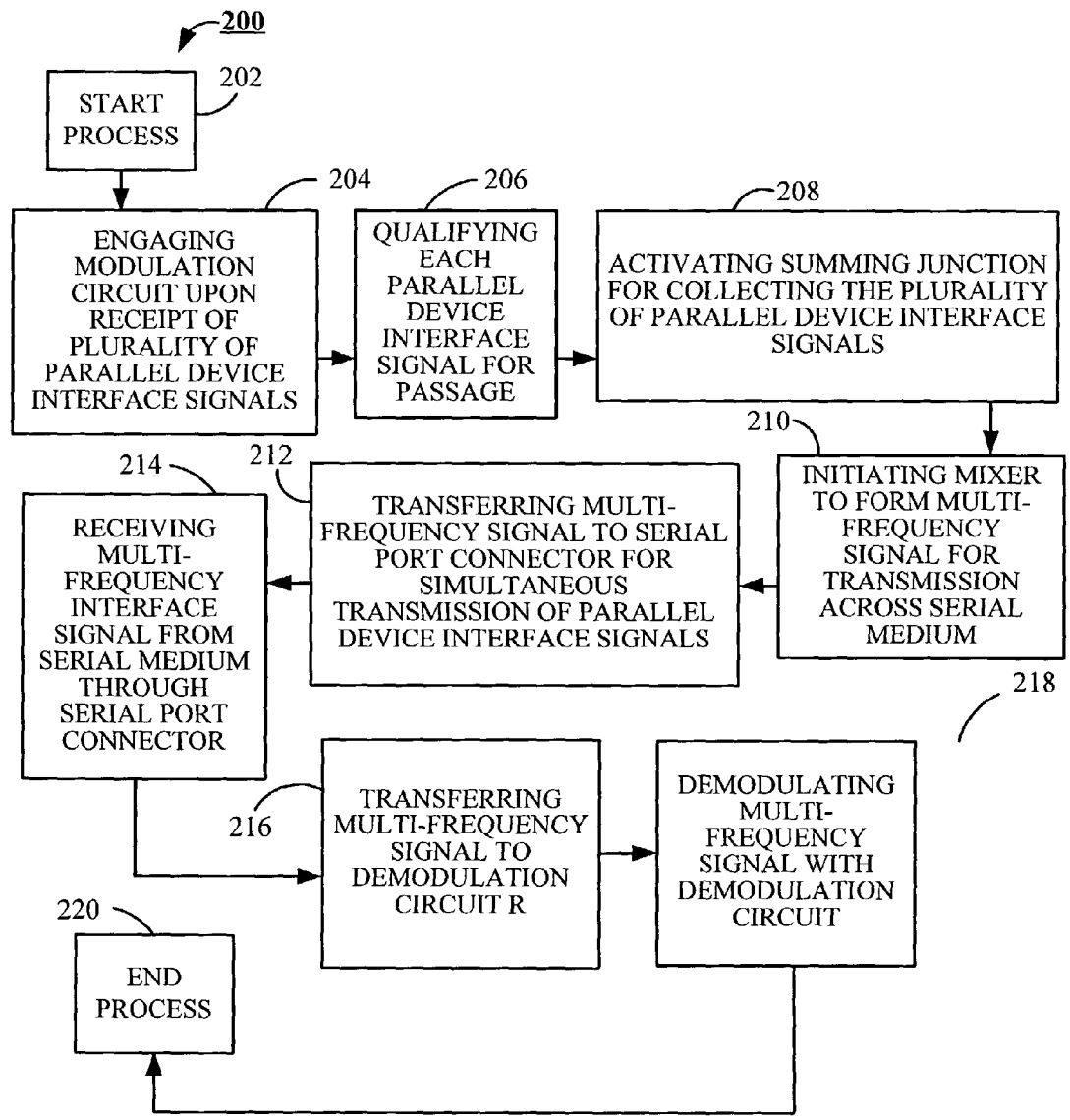
FIG. 5 is a flow chart of a method for simultaneous transmission of a parallel communication across a medium for the parallel interface modem of FIG. 3.

FIG. 5 shows steps for an interface signal communication process 200 used for simultaneous transfer of parallel interface signals across a medium via a multi-frequency signal. The signal communication process 200 begins at start process step 202 and continues at process step 204 by engaging a modulation circuit (such as 170) in response to receipt of the plurality of parallel device interface signals. The signal communication process 200 continues at process step 206 by qualifying each of the plurality of parallel device interface signals through use of a signal sense switch (such as 176) specifically configured to service a specific parallel device interface signal of the plurality of device interface signals.

At process step 208, in response to the modulation circuit, a summing junction (such as 188) is provided for collecting the plurality of qualified parallel device interface signals is activated. A mixer (such as 174), communicating with the summing junction, combines the plurality of qualified parallel device interface signals to form a multi-frequency signal for transmission across a medium at process step 210. The signal communication process 200 continues at process step 212 by transferring the multi-frequency signal to a serial port connector (such as 194) for simultaneous transmission of the plurality of modulated parallel device interface signals across the medium.

At process step 214, a multi-frequency modulated parallel device interface signal is received from the medium through the serial port connector, which activates a demodulation circuit (such as 172). At process step 216, the interface signal communication process 200 continues by transferring the multi-frequency modulated parallel device interface signal to the demodulation circuit communicating with the serial port connector for demodulation of the multi-frequency modulated parallel device interface signal.

At process step 218, the multi-frequency modulated parallel device interface signal is demodulated into a plurality of frequency specific, individual parallel device interface signals that have signal characteristic compliant with interface standards required by a host parallel device interface controller (such as 160) of a disc drive (such as 100). The signal communication process 200 concludes at end process step 220.

It will be understood by those skilled in the art that a number of modulation techniques are available and may be applied in the practice for the present invention without imposing limitations on the present invention. Among the types of applicable modulation techniques are On-Off Keying (OOK), Single Side-Band/On-Off Keying (SSB/OOK), Quadtrature Amplitude Modulation (QAM), Orthogonal Frequency Division Multiplexing (OFDM), Phase Shift Keying, Frequency Shift Keying, Time Division Multiple Access and Code Division Multiple Access.

Figure 6:
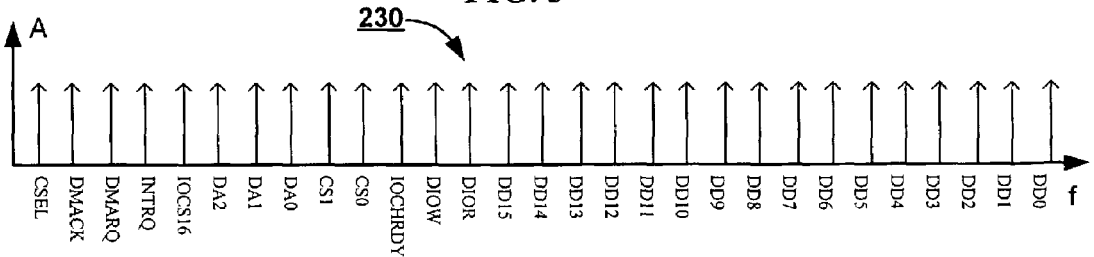
FIG. 6 is a diagram showing a pin-out for the parallel interface modem of FIG. 3 operating under an ATA interface protocol.

FIG. 6 illustrates a command line pin-out 230 for an ATA interface implementation of the present invention operating under an On-Off Keying (OOK) frequency modulation technique. Using the OOK technique, each ATA signal is modulated onto the medium in its own band. The host 164 (FIG. 1) and disc drive 100 (FIG. 1) are monitoring each band and know if another device is transmitting a specific ATA signal. In ATA no more than one signal is allowed to drive a signal at a time so there is no need to arbitrate between two transmitters on a signal's RF 'channel'. The total bandwidth required is number of signals multiplied by the bandwidth per signal. The higher frequency signals are allotted more bandwidth.

Figure 7:
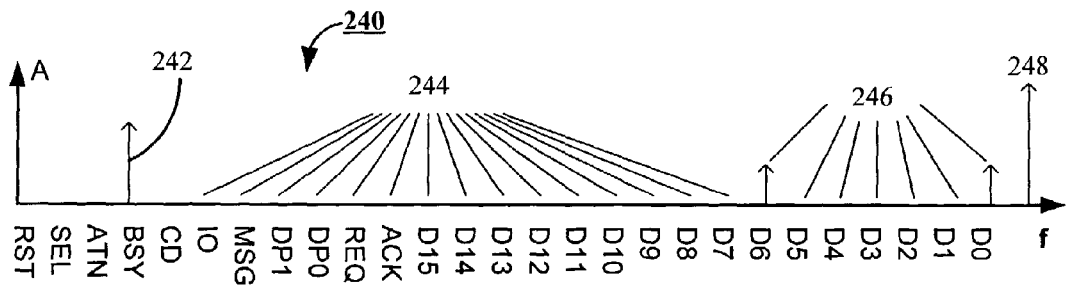
FIG. 7 is a diagram showing a pin-out for the parallel interface modem of FIG. 3 operating under a SCSI protocol.

FIG. 7 illustrates a command line pin-out 240 for a SCSI (Bus Arbitration Cycle) interface implementation of the present invention operating under a On-Off Keying (OOK) frequency modulation technique. During operation, a busy signal 242 is a result of two devices raising BSY at the same time. Signal lines shown by 244 are inactive during bus arbitration, while the signal line shown by 246 are active.

Using the OOK technique, each SCSI signal is modulated onto the medium in its own band. The host 164 (FIG. 1) and disc drive 100 (FIG. 1) are monitoring each band and know if another device is transmitting akin to parallel SCSI. If more than one device is modulating a channel or SCSI signal, the other devices will interpret this simply as at least one device is asserting even though the composite power will be proportionately greater. This is accomplished by assuring the phase of all transmitters on the SCSI are substantially the same and realized by dedicating one 'channel' to a carrier. The total bandwidth required is number of signals multiplied by the bandwidth per signal. The higher frequency signals are allotted more bandwidth. A carrier 248 is necessary to provide a phase reference to allow signals with contention to be summed easily under the OOK frequency modulation technique. Reset (RST) is indicated by the absence of the carrier 248. All devices connected see the absence or presence of the carrier 248 and know if the system was in reset or not.

Accordingly, embodiments of the present invention are directed to a parallel interface modem for simultaneous transfer of a plurality of parallel signals across a medium is disclosed. In accordance with one embodiment, a modulation circuit (such as 170) qualifies each of a plurality of parallel device interface signals for a medium communication and forwarding each qualified parallel device interface signal received from a host parallel device interface controller (such as 160) to a summing junction (such as 186). Each of a plurality of signal sense switches (such as 176) are specifically configured to service a particular interface signal defined by an interface standard. The plurality of signal sense switches provide the means for qualifying the plurality of parallel device interface signals.

A mixer (such as 174) communicating with the summing junction combines the plurality of qualified parallel device interface signals to provide a multi-frequency signal for transfer across the medium. A serial port connector (such as 198) communicating with the mixer simultaneously transmits the plurality of modulated parallel device interface signals, in the form of a multi-frequency signal, over the medium.

Additionally, a demodulation circuit (such as 172) communicating with the serial port connector demodulates each multi-frequency parallel device interface signal received from the medium for use by a host parallel device interface controller (such as 160).

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A method comprising:
   combining a plurality of parallel device interface signals that collectively form a parallel communication into a single multi-frequency signal; and
   transferring the multi-frequency signal across a medium to simultaneously transmit the plurality of parallel device interface signals using a corresponding plurality of switches each configured to carry out a sense operation on a corresponding one of the plurality of parallel device interface signals.

2. The method of claim 1, further comprising:
   receiving the multi-frequency signal from the medium; and
   demodulating the multi-frequency signal into individual signals corresponding to the plurality of parallel device interface signals in relation to respective frequency components of the multi-frequency signal.

3. The method of claim 1, wherein the corresponding plurality of switches are further each configured to forward said corresponding one of the plurality of parallel interface signals in response thereto for accumulation by a summing junction.

4. The method of claim 1, wherein the parallel communication formed by the plurality of parallel device interface signals of the combining step comprises a small computer systems interface (SCSI) formatted communication.

5. The method of claim 1, wherein the parallel communication formed by the plurality of parallel device interface signals of the combining step comprises an advanced technology attachment (ATA) formatted communication.

6. The method of claim 1, wherein the combining step comprises using a mixer circuit to generate the multi-frequency signal as a composite signal with respective frequency components each corresponding to a selected one of the plurality of parallel device interface signals.

7. The method of claim 1, wherein the transferring step comprises using a serial port connector in communication with the medium to transfer said multi-frequency signal.

8. The method of claim 1, wherein the medium of the transferring step is characterized as a single conduction path between a host device and a target device.

9. The method of claim 1, wherein the multi-frequency signal is characterized as an RF signal with a plurality of channels, each channel accommodating an information content of a different one of the plurality of parallel device interface signals.

10. The method of claim 9, wherein the combining step comprises allotting a respective bandwidth of each channel in relation to frequency.

11. An apparatus comprising a processing circuit configured to combine a plurality of parallel device interface signals that collectively form a parallel communication into a single multi-frequency signal and to transfer the multi-frequency signal across a medium, said transfer characterized as a simultaneous transmission of the plurality of parallel device interface signals, the apparatus further comprising a corresponding plurality of switches each configured to carry out a sense operation on a corresponding one of the plurality of parallel device interface signals.

12. The apparatus of claim 11, further comprising a summing junction which accumulates the plurality of parallel device interface signals from the corresponding plurality of switches.

13. The apparatus of claim 11, wherein the parallel communication formed by the plurality of parallel device interface signals comprises a small computer systems interface (SCSI) formatted communication.

14. The apparatus of claim 11, wherein the parallel communication formed by the plurality of parallel device interface signals of the combining step comprises an advanced technology attachment (ATA) formatted communication.

15. The apparatus of claim 11, wherein the plurality of switches form a modulator circuit coupled to a summing junction, and wherein the plurality of switches are further configured to forward said corresponding one of the plurality of parallel device interface signals to the summing junction in response thereto.

16. The apparatus of claim 11, in combination with a demodulator circuit configured to receive the multi-frequency signal from the medium and demodulate the multi-frequency signal into individual signals corresponding to the plurality of parallel device interface signals in relation to respective frequency components of the multi-frequency signal.

17. The apparatus of claim 11, wherein the multi-frequency signal comprises a composite radio frequency (RF) signal with a plurality of separate frequency bands individually corresponding to the plurality of parallel device interface signals.

18. The apparatus of claim 11, wherein the processing circuit comprises a mixer circuit.

19. The apparatus of claim 11, wherein the multi-frequency signal is characterized as an RF signal with a plurality of channels, each channel accommodating an information content of a different one of the plurality of parallel device interface signals.

20. The apparatus of claim 19, wherein the processing circuit allots a respective bandwidth of each channel in relation to frequency.

* * * * *